Oct. 23, 1956     L. R. HUSSA     2,767,816
POWER TAKE-OFF UNIT
Filed March 24, 1953
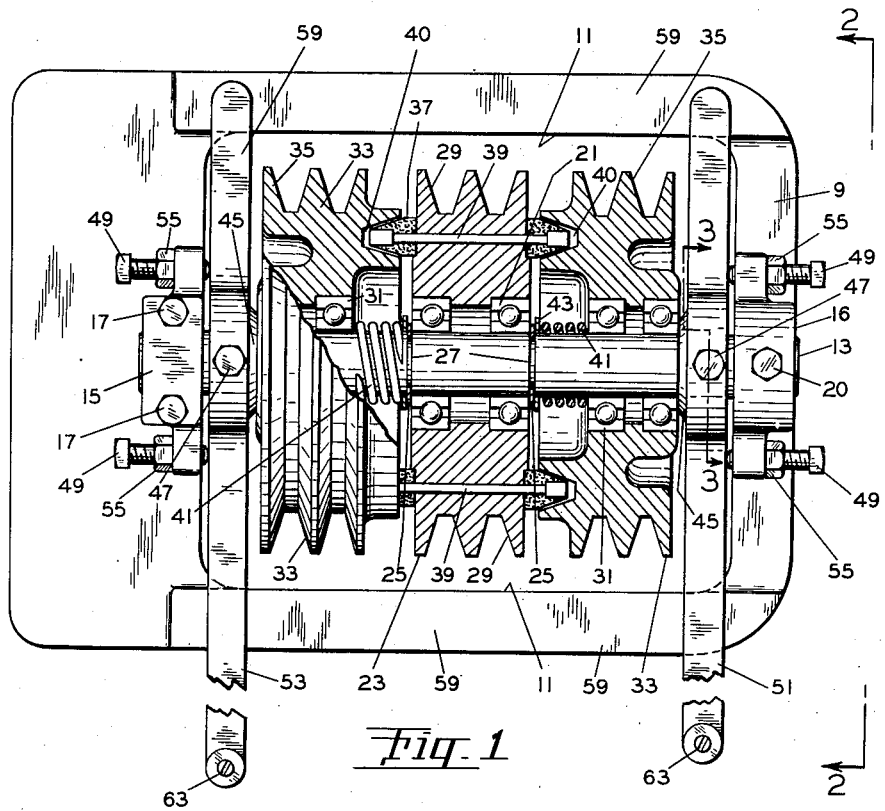
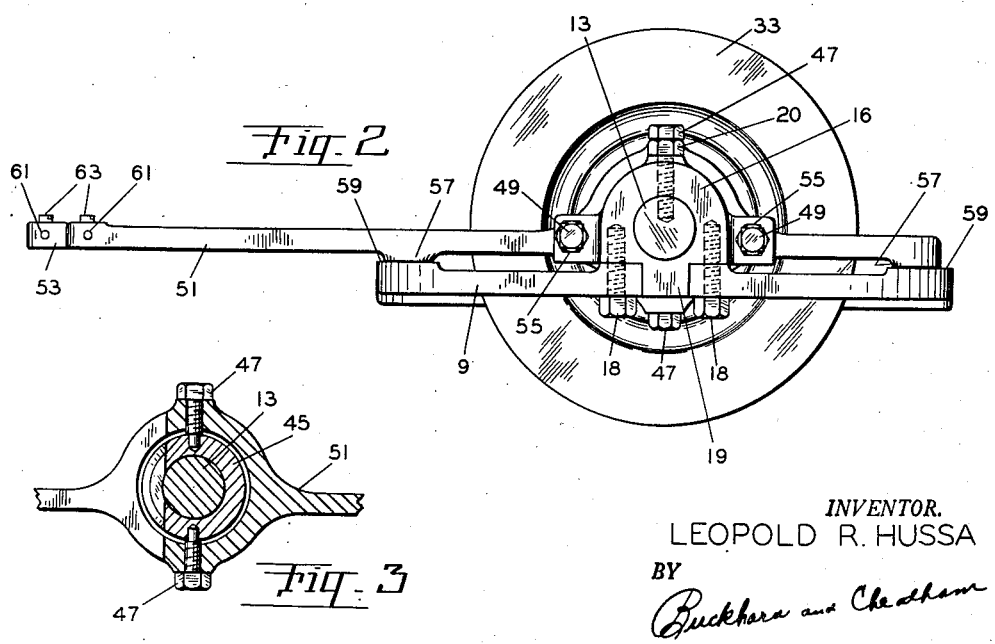
INVENTOR.
LEOPOLD R. HUSSA
BY
Buckhorn and Cheatham
ATTORNEYS

United States Patent Office 2,767,816
Patented Oct. 23, 1956

2,767,816

POWER TAKE-OFF UNIT

Leopold R. Hussa, Portland, Oreg.

Application March 24, 1953, Serial No. 344,365

3 Claims. (Cl. 192—48)

This invention relates to power take-off units and particularly to improvements in power take-off units of the type disclosed in my prior Patent 2,496,538, entitled "Power Take-off," granted February 7, 1950. The type of power take-off unit shown in the just-mentioned patent and under present consideration is adapted to be installed adjacent a source of power to be driven therefrom, and to deliver power, at the option of the operator, to utility units located adjacent to or in the vicinity of the power take-off unit.

The power take-off unit of my prior patent, above identified, includes a pair of power take-off sheaves disposed one on either side of a center sheave driven from a source of power. The sheaves are independently, rotatably mounted on a shaft supported by a frame. Arranged between each power take-off sheave and the center sheave is a friction element carried by the center sheave. A pair of sheave-actuating levers are provided, there being one for each power take-off sheave. Each lever is operatively connected to its power take-off sheave through a thrust collar which is slidably mounted on the shaft adjacent the outer face of the power take-off sheave. Spring means are provided for urging the power take-off sheave away from the friction elements and into engagement with the thrust collars.

The levers and the frame are so constructed that each lever may be selectively pivotally mounted on the frame on the opposite sides of the axis of rotation of the sheaves, one place enabling a lever when moved in one direction to force the associated power take-off sheave into engagement with the associated friction element and thus establish a drive from the center sheave to the mentioned power take-off sheave, and the other place enabling the lever when moved in the opposite direction to force the associated power take-off sheave into engagement with the associated friction element and thus establish a drive from the center sheave to the mentioned power take-off sheave. The ultimate user of the power take-off unit, knowing the direction from which the lever-actuating force is to be applied, is required to pivotally mount each lever at that place where the applied force to the lever will effect movement of the associated power take-off sheave into engagement with the associated friction element.

A main object of the present invention is to provide a power take-off unit of the type generally described above, but differing therefrom in that the levers are so mounted and associated with fulcrum means, which are provided, that a driving relationship between the center sheave and a power take-off sheave may be effected by movement of the lever, associated with the power take-off sheave, in either of its two directions of movement, and to provide such an arrangement which, though having the advantageous operating features above indicated, is less expensive in construction than my prior unit.

The levers of a power take-off unit such as described in my prior patent, above identified, are normally controlled by remotely located handles, levers, et cetera, which are connected to the levers of the unit by wires, cables, rods, et cetera. The arrangement is such that when a remotely located handle is moved to a predetermined spacial position, where it is releasably locked or latched in place, a driving relationship between the center sheave and the power take-off sheave associated with the handle is effected.

Frequently, it is not practical to provide turnbuckles, or equivalent devices, in the connecting medium between a remotely located handle and the associated lever of the power take-off unit, for varying the length of the connecting medium, because of the lack of access to such connecting medium, as when a power take-off unit is mounted in a power boat and the connecting medium runs under decks and equivalent places. Therefore, when the friction elements eventually wear to a considerable degree, proper engagement between a power take-off sheave and the associated friction element is not effected by throwing the associated remotely located handle to its engaged position, and thus undesirable slipping occurs between the power take-off sheave and the friction elements. In my prior construction, the only practical remedy was a time-consuming operation of changing connecting cables and the like, or to disassemble the power unit and replace the worn friction elements with new ones.

Another object of the present invention is to provide a power take-off unit of the type generally described above, wherein the levers are floatingly mounted, and wherein means are provided for bodily adjusting the levers relative to the center sheave, whereby proper adjustment may be made, when the friction elements wear, to insure that when a remotely located handle is thrown to its engaged position, the associated lever at the power unit will be moved to dispose the associated power take-off sheave in proper engagement with the associated friction element.

For a consideration of what is believed novel and inventive, attention is directed to the following description taken in connection with the accompanying drawings, while the features of novelty will be pointed out with greater particularity in the appended claims.

In the drawings:

Fig. 1 is a plan view of a power take-off unit embodying the concepts of the present invention, parts being broken away for convenience in illustration;

Fig. 2 is an end view of the unit disclosed in Fig. 1, taken in the direction of the arrows 2—2 in Fig. 1; and Fig. 3 is a fragmentary, sectional view taken along line 3—3 of Fig. 2, showing the pivotal connection between a lever and its thrust collar.

Referring to the accompanying drawings, wherein similar reference characters designate similar parts throughout, the power take-off unit disclosed includes a frame 9, of generally rectangular configuration in plan, formed with a generally rectangular, sheave-accommodating opening 11. Supported by the frame is a stationary shaft 13, extending generally medially across opening 11 and received at its ends by pillow blocks 15 and 16, which are secured by bolts 17 and 18, respectively, to said frame.

The blocks are of slightly different construction, in that bolts 17 for block 15 extend downwardly therethrough and thread into frame 9, whereas bolts 18 for block 16 extend upwardly through frame 9 and thread into the block. This difference has no bearing on the invention, being made for manufacturing reasons not of importance to the present explanation. Each block has a depending thrust lug snugly fitting within a mating slot formed in the frame. The lug for block 16 is shown in Fig. 2 and is identified by the reference numeral 19. A screw 20 is threaded into pillow block 16 and fits into and bears against the bottom of a mating hole formed in the shaft to prevent rotation of the shaft.

Mounted centrally on shaft 13 by a pair of radial thrust bearings 21 is a center sheave 23 disposed within opening 11 and counterbored to receive the outer races of the bearings. Split rings 25 fit within annular grooves 27 formed in the shaft to prevent endwise movement of the bearings and thus of the center sheave. Sheave 23 is adapted to be belt-driven from a source of power (not shown), and to this end the center sheave has formed peripherally therearound one or more belt-receiving grooves 29, two of such grooves being shown.

Disposed one on either side of the center sheave 23, accommodated within opening 11, and mounted on the shaft 13 by radial thrust bearings 31, are a pair of power take-off sheaves 33 counterbored to receive the outer races of the bearings. The inner races of the bearings of each power take-off sheave are dimensioned to slidably fit on shaft 13 to permit endwise movement of the power take-off sheaves toward and away from center sheave 23. Each power take-off sheave has formed peripherally therearound one or more belt-receiving grooves 35, two being shown for each power take-off sheave. Belts (not shown) are adapted to be trained about the power take-off sheaves to transmit power to the devices to be driven by the power take-off unit.

Arranged between the power take-off sheaves 33 and the center sheave 23 are annular friction elements 37 secured by rivets 39 to center sheave 23. Each friction element is slightly tapered in an axial direction, and each power take-off sheave is provided on its inner face with an annular groove 40 complementary in formation to the configuration of the opposing friction element, so that when a power take-off sheave is forced into engagement with the associated friction element, the radial vector of the resulting force will be much larger than the axial vector. This insures a good driving relationship between the center sheave and the power take-off sheaves with a minimum axial thrust.

Urging the power take-off sheaves away from the center sheave are compression springs 41, fitting on shaft 13 and axially bearing against the inner races of the power take-off sheave bearings and thrust washers 43. Sheaves 33 are counterbored to accommodate springs 41 (see Fig. 1). Washers 43 fit on the shaft 13 and are forced into engagement by the compression springs with split rings 25.

Limiting outward movement of each power take-off sheave to a point where it is just out of engagement with the associated friction element is an assemblage including a thrust collar 45 (compare Figs. 1 and 3) slidably mounted on the shaft 13 and engaging the inner race of the adjacent bearing, a lever having an enlarged portion apertured to surround and pivoted by plain-ended pivot bolts 47 to the thrust collar, and a pair of fulcrum elements 49 located on opposite sides of shaft 13 and threadedly extending through wing portions formed on the associated pillow block, and against which the lever is urged by the associated compression spring. The two levers preferably are of slightly different lengths, for a purpose to be presently described, the shorter lever being designated by the reference numeral 51 and the longer lever being designated by the reference numeral 53. Holding the fulcrum elements in any position of adjustment are jam nuts 55.

Preventing rotation of each lever sympathetically with the associated power take-off sheave, when the power take-off sheave is being driven, are depending bosses 57 formed on said lever and slidably engaging guide strip portions 59 formed on frame 9.

The outer operating ends of levers 51 and 53 have cable-receiving holes 61 formed horizontally therethrough in a direction normal to the lengths of the levers, there being vertically disposed setscrews 63 threadedly received by the levers and adapted to clamp against the cable ends received in holes 61.

As previously mentioned, levers 51 and 53 are of slightly different lengths. Consequently, it is apparent, by viewing Fig. 1, that when the lever-actuating cables extend to the right, the cable attached to lever 53 is spaced from the operating end of lever 51. This is an advantageous feature, but not necessarily provided, since when such cables extend to the left, the cable fastened to lever 51 merely slides across lever 53, or passes above or below it, depending on the inclination of the cables. If sliding contact does exist, it may be readily eliminated, if desired, by leading the cable of lever 51 over a pulley mounted adjacent the power unit at a level different from that of the levers.

For purposes of explaining the operation of the power take-off unit, the lower part of the unit, as the parts are depicted in Fig. 1, will be considered as the front of the device, while the upper part of the unit will be considered as the back of the device.

When the operating end of lever 51 is moved in the direction of lever 53, lever 51 will fulcrum on the rear fulcrum element, of the associated fulcrum elements, to force the associated power take-off sheave into driving relationship with the center sheave; and when lever 51 is moved in the opposite direction it will fulcrum on the front fulcrum element, of the associated fulcrum elements, to force the associated power take-off sheave into driving relationship with the center sheave. Lever 53 functions similarly with reference to its fulcrum elements and power take-off sheave.

It follows, therefore, that the ultimate user need not make any adjustment or rearrangement of the manner of mounting the levers when he receives a power unit, but may merely connect up a lever with a remotely located handle without regard to the direction in which the lever is to be moved, since the lever will actuate the associated power take-off sheave when moved in either of its two directions of movement. The power take-off unit of the present invention is obviously ideally suited to those instances where it is desirable to connect a lever so that it may be alternately or selectively moved in opposite directions for effecting a driving relationship between the associated power take-off sheave and the center sheave.

It is apparent that the degree of movement of a lever required to effect a driving relationship of the associated power take-off sheave with the center sheave can be varied by an appropriate adjustment of the associated fulcrum elements, to adapt the power take-off unit to the existing amount of handle movement available or desired, so that when the handle is thrown to its engaged position, the associated power take-off sheave is disposed in proper driving relationship with the center sheave.

When the friction drive elements eventually wear to the point that proper driving engagement of a power take-off sheave with the associated friction drive element is not obtained with the existing amount of movement of the associated remotely located handle, the situation may be readily corrected by adjusting the associated fulcrum elements to positions where the lever again causes correct driving engagement of the particular power take-off sheave with the associated friction drive element, when the remotely located handle is disposed in its engaged or drive position. This adjustment will cause the lever to occupy operative and inoperative positions slightly inclined from its original operative and inoperative positions. This disposition of the lever will not in any way detrimentally affect the operation of the power take-off unit.

Another advantage of the power take-off unit of the present invention is that the tolerances of the various parts do not have to be as closely held as in my prior unit, since by appropriate adjustment of the fulcrum elements, a uniform degree of movement of each lever, in order to effect a driving relationship between the associated power take-off sheave and the center sheave, may be obtained in each power take-off unit, despite difference of dimensions of different units.

Having described the invention in what are considered to be preferred embodiments thereof, it is desired that it be understood that the specific details shown are merely illustrative and that the invention may be carried out in other ways.

What I claim as my invention is:

1. A power take-off unit, including a pair of power take-off sheaves disposed one on either side of a center sheave, the sheaves being independently rotatable about a common axis, friction drive means arranged between the power take-off sheaves and the center sheave, the center sheave being axially stationary and adapted to be driven from a source of power and to selectively drive the power take-off sheaves through the friction drive means when the power take-off sheaves are forced axially toward the center sheave, a pair of stationary fulcrum elements disposed adjacent the outer face of each power take-off sheave, each pair of fulcrum elements being disposed one on either side of the axis of rotation of the sheaves, a lever operatively connected by thrust transmitting means to each power take-off sheave at a place between the associated fulcrum elements, considered in a direction normal to the axis of rotation of the sheaves, and arranged in cooperative alignment with the fulcrum elements, whereby when a lever is moved in one direction it will force the associated power take-off sheave toward the center sheave by fulcruming on one of the associated fulcrum elements, and when moved in the opposite direction it will force the associated power take-off sheave toward the center sheave by fulcruming on the other of the associated fulcrum elements, and means for independently adjusting the fulcrum elements toward and away from the center sheave, whereby the spacing of the power take-off sheaves relative to the center sheave may be varied.

2. A power take-off unit, including two sheaves independently rotatable about a common axis, friction drive means between the sheaves, one sheave being axially stationary and adapted to be driven from a source of power and to drive the other sheave through the friction means when said other sheave is shifted toward said one sheave, said other sheave being a power take-off sheave adapted to transmit power through a belt to an adjacent device, a fulcrum element disposed on either side of the axis of rotation of said sheaves adjacent the outer face of said other sheave, and a lever arranged between the fulcrum elements and said outer sheave in operative relationship to both of said elements and being operatively connected by thrust transmitting means to said outer sheave at a place between the fulcrum elements considered in a direction normal to the axis of rotation of the sheaves and to a line through the elements, whereby the lever will fulcrum on one or the other of said fulcrum elements when moved one way or the other to, in each instance, shift said other sheave toward said one sheave.

3. A power take-off unit including a support, a countershaft carried by the support, a driven sheave and a driving sheave rotatably mounted on said countershaft, one sheave being slidable along said shaft, spring means urging said one sheave away from the other sheave, friction means between the sheaves for establishing a driving connection between the sheaves when said one sheave is shifted toward the other sheave, a collar slidably mounted on said countershaft adjacent the outer face of said one sheave, a lever extending transversely of said countershaft and being pivotally connected to said collar, a pair of fulcrum elements disposed one on either side of said countershaft in a direction parallel to the direction of extension of said lever and threadedly extending through a portion of said support and having their inner ends engaging said lever whereby said lever is operable when swung in opposite directions to cause said one sheave to move toward the other sheave, and whereby wear of the friction means may be compensated for by adjustment of said fulcrum elements in a manner to shift said lever and thus said one sheave toward said other sheave.

References Cited in the file of this patent

UNITED STATES PATENTS

| 1,552,368 | Whitacre | Sept. 1, 1925 |
| 2,496,538 | Hussa | Feb. 7, 1950 |
| 2,646,081 | Ritsky | July 21, 1953 |